(12) United States Patent
Suzuki et al.

(10) Patent No.: US 8,693,874 B2
(45) Date of Patent: Apr. 8, 2014

(54) TRANSMISSION SYSTEM AND METHOD OF CORRECTING TILT OF THE TRANSMISSION SYSTEM

(75) Inventors: Tomoyuki Suzuki, Kanagawa (JP); Kenji Watanabe, Kanagawa (JP); Koji Tanonaka, Kanagawa (JP); Akihisa Kawaguchi, Kanagawa (JP); Takehiro Fujita, Kanagawa (JP)

(73) Assignees: Fujitsu Limited, Kanagawa (JP); Fujitsu Telecom Networks Limited, Kanagawa (JP)

( * ) Notice: Subject to any disclaimer, the term of this patent is extended or adjusted under 35 U.S.C. 154(b) by 502 days.

(21) Appl. No.: 12/766,271

(22) Filed: Apr. 23, 2010

(65) Prior Publication Data

US 2010/0322633 A1    Dec. 23, 2010

(30) Foreign Application Priority Data

Jun. 23, 2009  (JP) .................. 2009-148992

(51) Int. Cl.
- H04J 14/02    (2006.01)
- H04B 10/00    (2013.01)
- G02B 6/26     (2006.01)
- G02B 6/28     (2006.01)

(52) U.S. Cl.
USPC .......... 398/93; 398/160; 398/43; 398/79; 398/81; 385/27; 385/24; 385/16; 359/342; 359/341

(58) Field of Classification Search
USPC .......................... 398/81, 79, 43, 42
See application file for complete search history.

(56) References Cited

U.S. PATENT DOCUMENTS

| | | | | |
|---|---|---|---|---|
| 6,496,619 B2* | 12/2002 | Naganuma | | 385/27 |
| 6,747,793 B1* | 6/2004 | Flanders | | 359/344 |
| 2003/0231886 A1* | 12/2003 | Young et al. | | 398/101 |
| 2004/0136054 A1* | 7/2004 | Terahara | | 359/337.1 |
| 2004/0161234 A1* | 8/2004 | Ozawa | | 398/33 |
| 2005/0063704 A1* | 3/2005 | Lee et al. | | 398/66 |
| 2005/0158057 A1* | 7/2005 | Tomofuji et al. | | 398/160 |
| 2007/0077066 A1* | 4/2007 | Nakamoto | | 398/33 |
| 2007/0206955 A1* | 9/2007 | Uda et al. | | 398/177 |

FOREIGN PATENT DOCUMENTS

| | | |
|---|---|---|
| JP | 11-312839 | 11/1999 |
| JP | 2004-023437 | 1/2004 |
| JP | 2007-531900 | 11/2007 |
| JP | 2009-017451 | 1/2009 |
| WO | WO2005093497 | 10/2005 |

OTHER PUBLICATIONS

Office action mailed on May 7, 2013 from corresponding Japanese Patent Application No. 2009-148992 and its English summary provided by the clients.

* cited by examiner

Primary Examiner — Oommen Jacob
(74) Attorney, Agent, or Firm — Ladas & Parry, LLP (57) ABSTRACT

A transmission system is provided with a transmission apparatus that outputs an ASE light from a transmission light amplifier and with a reception apparatus provided with: a tilt detection unit that detects the optical strength levels of at least two probe lights having different wavelengths from a received ASE light; and a reception light amplifier that performs a first-order tilt correction on light to be output in a linear manner so as to reduce the difference in the optical strength level of the two probe lights detected by the tilt detection unit.

10 Claims, 8 Drawing Sheets

TRANSMISSION SYSTEM AND METHOD OF CORRECTING TILT OF THE TRANSMISSION SYSTEM

CROSS-REFERENCE TO RELATED APPLICATIONS

This application claims priority to Japanese Patent Application No. 2009-148992 filed on Jun. 23, 2009, the disclosure of which is incorporated herein by reference in its entirety.

BACKGROUND OF THE INVENTION

1. Field of the Invention

The present invention relates to a transmission system and a method of correcting the tilt of the transmission system for proper tilt correction.

2. Description of the Related Art

An optical wavelength division multiplex system wavelength-multiplexes multiple optical signals into both a C band (1530-1570 nm) and an L band (1570-1610 nm) and transmits the wavelength-multiplexed optical signals. In the optical wavelength division multiplex system, when the transmission distance is long, the influence of the wavelength characteristics and the non-linear effect of optical fiber during transmission cause a difference in the optical strength levels among wavelengths. When the differences among the optical strength levels become larger, an error is caused (e.g., a reception error) in the optical wavelength division multiplex system, preventing accurate communication.

One option for suppressing the production of the difference in the optical strength level is, for example, a tilt correction method of appropriately adjusting the amplification amount of a pump LD based on a parameter set in advance in an inline amplifier. A tilt correction method is also known where a spectrum analyzer is placed at a receiving node and where tilt correction is performed by appropriately adjusting the outgoing level of each channel (ch) among transmitting nodes based on information on the difference in the optical strength level of each channel measured by the spectrum analyzer.

For example, Patent Document 1 shown below describes realizing tilt correction by detecting the optical strength level of the short wavelength side and the optical strength level of the long wavelength side of a transmitted signal light by the monitor PD (Photo Diode) of a DMUX (Demultiplexer) unit of an OADM (Optical Add Drop Multiplexer) node of the receiving side, calculating a tilt correction parameter based on the optical strength level of the short wavelength side and the optical strength level of the long wavelength side both obtained from a monitor PD, and allocating the correction parameter onto the amplifier of each relay node.

According to the disclosure of the document, when the amount of tilt of a wavelength-multiplexed signal received by an optical transmission apparatus is not in an appropriate range, the amount of tilt correction is fed back to each optical amplifier (e.g., ILA: In-Line Amplifier) located on the transmission path of the wavelength-multiplexed signal, and tilt correction is performed based on the amount of the tilt correction of each optical amplifier. This allows the optical transmission apparatus to receive a wavelength-multiplexed signal on which a proper tilt correction is performed, in other words, a wavelength-multiplexed signal having a proper OSNR (Optical Signal to Noise Ratio).

[Patent document No. 1] Japanese Patent Application Laid-open 2009-17451

The method of correcting tilt where the amplification amount of a pump LD is appropriately adjusted based on a parameter set in advance in an inline amplifier is a relatively simple correction method. However, proper tilt correction cannot be carried out based on the parameter that has been set in advance when, for example, the transmission distance considered to be the most appropriate, based on the aspect of design, is different from the actual transmission distance or when the type of fiber that is actually laid is not the one that has been expected during the design phase, and the difference in the optical strength level among channels thus cannot be overcome.

An increased number of relay stages increases the difference in the optical strength level in a cumulative manner. Thus, the use of the method of correcting tilt is substantially limited to an optical wavelength division multiplex system architecture in a metro area where the number of relay stages is low enough to prevent superimposition of the difference in optical strength levels. Placing a spectrum analyzer at a receiving node not only complicates the configuration but also results in a relatively expensive optical wavelength division multiplex system.

In a method where the amount of tilt correction is calculated based on the difference in the optical strength level between the short wavelength side and the long wavelength side and allocated to each inline amplifier, tilt correction control is performed by using a signal light. Thus, for example, when a small number of wavelength channels is used only on the short wavelength side or only on the long wavelength side, the difference in the optical strength level between the short wavelength side and the long wavelength side cannot be obtained; thus, there is concern that the tilt correction cannot be properly performed. Therefore, it is difficult to guarantee the changeover time, for example, in the case where a high-speed wavelength extension, such as route switching in mesh topology, is required.

SUMMARY OF THE INVENTION

In this background, a purpose of the present invention is to provide a transmission system or the like that can easily perform proper tilt correction at a low cost.

A transmission system according to the invention comprises: a transmission apparatus operative to output an ASE light from a transmission light amplifier; and a reception apparatus including: a tilt detection unit operative to detect the optical strength levels of at least two probe lights having different wavelengths from the received ASE light; and a reception light amplifier operative to perform a first-order tilt correction on light to be output in a linear manner so as to reduce the difference in the optical strength level of the two probe lights detected by the tilt detection unit.

Preferably, in the transmission system according to the invention, a transmission light amplifier may include a cut-off unit that cuts off a communication light so that the reception light amplifier performs the first tilt correction based on the ASE light output from the transmission light amplifier when the transmission amplifier does not output the communication light.

Further preferably, in the transmission system according to the invention, the tilt detection unit may include two fixed narrow-band optical filters that extract the two probe lights from the received ASE light.

Further preferably, in the transmission system according to the invention, the tilt detection unit may include one tunable optical filter that extracts the two probe lights from the received ASE light.

Further preferably, the transmission system according to the invention may be configured so that the transmission apparatus output an ASE light that corresponds to each of a plurality of channels for different wavelengths, and so that the reception apparatus includes: an optical strength level detection-per-channel unit that detects the optical strength level of the received ASE light for each of the plurality of channels; an average value calculation unit that calculates the average value of the optical strength levels detected by the optical strength level detection-per-channel unit; a difference calculation-per-channel unit that calculates for each channel the difference between the average value computed by the average value calculation unit and the optical strength level detected by the optical strength level detection-per-channel unit; and a feedback transmission unit that transmits as feedback the difference calculated by the difference calculation-per-channel unit to the transmission apparatus, and the transmission apparatus performs a second-order tilt correction by adjusting for each channel the VOA of a wavelength multiplexer so as to reduce the difference transmitted as feedback by the feedback transmission unit.

Further preferably, in the transmission system according to the invention, the tilt detection unit, instead of the optical strength level detection-per-channel unit, may include one tunable optical filter and detect for each of the plurality of channels the optical strength level of the received ASE light.

Further preferably, in the transmission system according to the invention, the feedback transmission unit may use a supervisory control channel when transmitting as feedback the difference calculated by the difference calculation-per-channel unit to the transmission apparatus.

A tilt correction method of a transmission system according to the invention comprises: outputting an ASE light from a reception light amplifier by a transmission apparatus; performing tilt detection by detecting the optical strength levels of at least two probe lights having different wavelengths from the received ASE light by an reception apparatus; and performing a first-order tilt correction by the reception apparatus on light output from a reception light amplifier in a linear manner so as to reduce the difference in the optical strength levels.

Preferably, the tilt correction method of a transmission system according to the invention may comprise cutting off, by the transmission light amplifier, a communication light so that the reception light amplifier performs the first-order tilt correction based on the ASE light output from the transmission light amplifier when the transmission amplifier does not output the communication light.

Further preferably, in the tilt correction method of a transmission system according to the invention, the two probe lights may be extracted, in performing the tilt detection, from the ASE light received by using two fixed narrow-band optical filters.

Further preferably, in the tilt correction method of a transmission system according to the invention, the two probe lights may be extracted, in performing the tilt detection, from the ASE light received by using one tunable optical filter.

Further preferably, the tilt correction method of a transmission system according to the invention may comprise steps as follows: outputting, by the transmission apparatus, an ASE light that corresponds to each of a plurality of channels for different wavelengths; performing, by the reception apparatus, an optical strength level detection on a per-channel basis so as to detect the optical strength level of the received ASE light for each of the plurality of channels, an average value calculation so as to calculate the average value of the optical strength levels detected in the optical strength level detection on a per-channel basis, a difference calculation per channel so as to calculate for each channel the difference between the average value calculated in the average value calculation and the optical strength level detected in the optical strength level detection on a per-channel basis, and a feedback transmission so as to transmit as feedback the difference calculated in the difference calculation-per-channel to the transmission apparatus; and performing, by the transmission apparatus, a second-order tilt correction by adjusting for each channel a VOA of a wavelength multiplexer so as to reduce the difference transmitted as feedback in the feedback transmission.

Further preferably, in the tilt correction method of a transmission system according to the invention, the optical strength level of the received ASE light may be detected, in the optical strength level detection on a per-channel basis, for each of the plurality of channels by using one tunable optical filter.

Further preferably, in the tilt correction method of a transmission system according to the invention, the difference calculated in the difference calculation per channel by using a supervisory control channel may be transmitted, in the feedback transmission, as feedback to the transmission apparatus.

BRIEF DESCRIPTION OF THE DRAWINGS

Embodiments will now be described, by way of example only, with reference to the accompanying drawings, which are meant to be exemplary, not limiting, and wherein like elements are numbered alike in several Figures, in which.

DETAILED DESCRIPTION OF THE INVENTION

The invention will now be described by reference to the preferred embodiments. This does not intend to limit the scope of the present invention, but to exemplify the invention.

In the embodiment, a detailed description is made regarding an optical WDM (wave division multiplex) transmission system that properly performs tilt correction control on the differences in the optical strength levels among channels, which are produced during optical transmission. The optical WDM transmission system explained in the embodiment performs automatic tilt correction by using an ASE light.

The optical WDM transmission system explained in the embodiment computes the amount of tilt correction, for example, during the system construction or the system start-up, by using the ASE (Amplified Spontaneous Emission) light of a transmission light amplifier without having to use a signal light, a spectrum analyzer, or the like.

The optical WDM transmission system performs individually both a first-order correction, which is a linear correction and is a so-called coarse correction, and a second-order correction to every channel. In a relay apparatus of an optical WDM transmission system, the first-order correction is typically performed on the amplification amount of the pump LD of the relay apparatus in a linear manner so as to reduce the difference in the optical strength level of an ASE light between the long wavelength side and the short wavelength side, which is detected by a tilt detection unit provided to the relay apparatus.

In a reception apparatus of an optical WDM transmission system, the first-order correction is typically performed on the amplification amount of the pump LD of the reception apparatus in a linear manner so as to reduce the difference in the optical strength level of an ASE light between the long wavelength side and the short wavelength side, which is detected by a tilt detection unit provided to the reception apparatus.

In the second-order correction, the amount of tilt correction is determined for every channel by using the ASE light of a transmission light amplifier, which is output from a transmission apparatus, so as to obtain a uniform received optical strength level for the monitor PD for every channel provided to a wavelength dividing unit (including a DMUX) of the reception apparatus. More specifically, the reception apparatus detects the ASE light at the monitor PD and feeds the differences among the average value of the received optical strength levels of all channels and the received optical strength level of each channel back to a transmission apparatus.

The transmission apparatus determines for every channel the amount of tilt correction of a VOA (Variable Optical Attenuator) of a wavelength multiplexer (including a MUX) so as to reduce the difference that is fed back. This allows the optical WDM transmission system explained in the embodiment to easily achieve a more accurate and detailed tilt correction for every channel at a low price.

Even if great correction is necessary that goes beyond an adjustment range of the VOA, the optical WDM transmission system can carry out the second-order correction just with fine adjustment within an adjustable range of the VOA since the second-order correction is carried out by the VOA after the coarse adjustment is carried out in advance during the first-order correction. Furthermore, even in the case of a communication light having a narrow band whose bandwidth is not wide enough for the first-order correction, which is a linear correction, the optical WDM transmission system explained in the embodiment computes the amount of tilt correction during, for example, the start-up of the apparatus by using the ASE light and stores the amount of tilt correction. Therefore, even in the case of, for example, a narrowband communication light only on the long wavelength side or only on the short wavelength side, the optical WDM transmission system can perform relatively accurate tilt correction based on the amount of tilt correction that has been computed and stored in advance.

Figure 2:
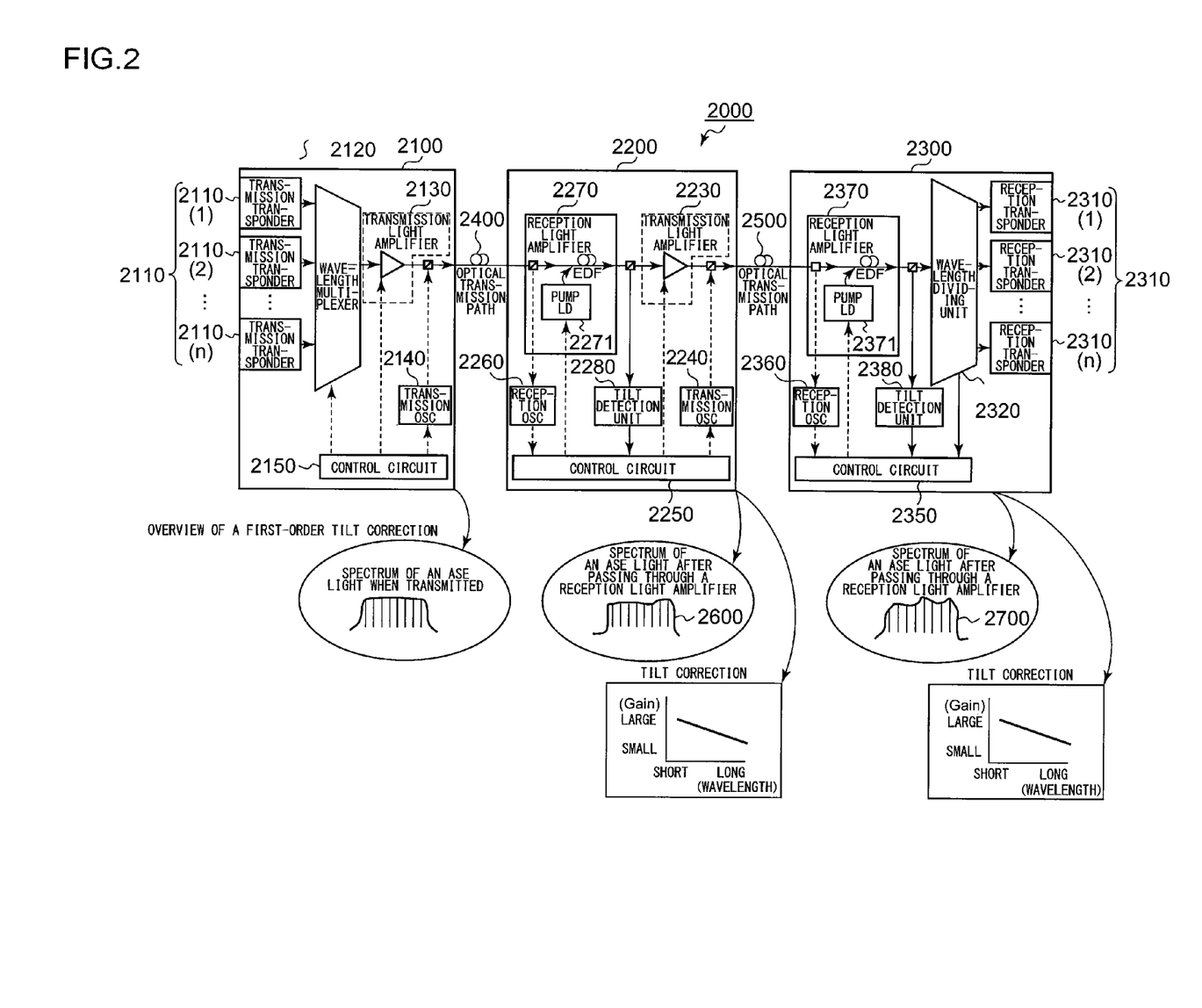
FIG. 2 is a block diagram conceptually illustrating the configuration of an optical wavelength division multiplex transmission system provided with an automatic tilt correcting function.

In reference to FIG. 2, a detailed description is made regarding the overview of a configuration where an optical WDM transmission system 2000 performs a first-order tilt correction. FIG. 2 is a block diagram conceptually illustrating the configuration of the optical WDM transmission system 2000 provided with an automatic tilt correcting function.

As shown in FIG. 2, the optical WDM transmission system 2000 is provided with a transmission apparatus (also referred to as a transmission OADM (Optical Add Drop Multiplex) node) 2100, a relay apparatus (also referred to as a relay node) 2200, and a reception apparatus (also referred to as a reception OADM node) 2300.

The transmission apparatus 2100 and the relay apparatus 2200, and the relay apparatus 2200 and the reception apparatus 2300 are connected, respectively, by optical transmission paths 2400 and 2500 of optical fibers in an optically communicable manner.

The transmission apparatus 2100 is provided with n transmission transponders 2110, n being an arbitrary number that corresponds to the number of multiplexed wavelengths. With regard to n transmission transponders 2110 provided to the transmission apparatus 2100 where n is an arbitrary number, for example, n is represented by n=40 when forty waves are synthesized, and n is represented by n=80 when eighty waves are synthesized. The transmission transponder 2110 converts a signal to be wavelength-multiplexed and transmitted such as a SONET and a GbE signal into a narrowband optical signal to be wavelength-multiplexed.

The transmission apparatus 2100 is provided with a wavelength multiplexer 2120 that multiplexes light having n wavelengths, which is output from the transmission transponder 2110. The wavelength multiplexer 2120 has a function of adjusting, monitoring, and wavelength-multiplexing the signal level from the transmission transponder 2110.

The transmission apparatus 2100 is provided with a transmission light amplifier 2130 that amplifies the communication light to be transmitted to the relay apparatus 2200 via the optical transmission path 2400. The transmission light amplifier 2130 passes an ASE light for the optical WDM transmission system 2000 to determine the amount of tilt correction.

The transmission apparatus 2100 is also provided with a transmission OSC (Optical Supervisory Channel) 2140 that transmits to the relay apparatus 2200 various supervisory control signals by using a supervisory control channel. The supervisory control channel is provided only for transmitting supervisory control information via the optical transmission path 2400 by using a wavelength different from that of the communication light. The transmission apparatus 2100 is also provided with a control circuit 2150 that supervises and controls the wavelength multiplexer 2120, the transmission light amplifier 2130, and the like.

The relay apparatus 2200 is provided with a reception light amplifier 2270 that receives and amplifies the communication light transmitted via the optical transmission path 2400. The reception light amplifier 2270 is provided with a pump LD 2271 that provides light to be amplified. Also, the relay apparatus 2200 is provided with a transmission light amplifier 2230 that amplifies a communication light to be transmitted to the reception apparatus 2300 via the optical transmission path 2500.

The relay apparatus 2200 is also provided with a reception OSC 2260 that receives the various supervisory control signals transmitted to the relay apparatus 2200 by the transmission OSC 2140 by using a supervisory control channel. The relay apparatus 2200 is also provided with a transmission OSC 2240 that transmits various supervisory control signals to the reception apparatus 2300 by using a supervisory control channel.

The relay apparatus 2200 is provided with a tilt detection unit 2280 that detects the difference in the optical strength level of an ASE light between the long wavelength side and the short wavelength side to determine the amount of the first-order correction, which is a linear correction. The relay apparatus 2200 is also provided with a control circuit 2250 that supervises and controls the tilt detection unit 2280, the transmission light amplifier 2230, and the like.

The control circuit 2250 performs the first-order tilt correction of a communication light by appropriately adjusting the amplification amount of a pump LD 2271 so as to reduce the difference in the optical strength level of an ASE light between the long wavelength side and the short wavelength side, which is detected by the tilt detection unit 2280.

The reception apparatus 2300 is provided with a reception light amplifier 2370 that receives and amplifies the communication light transmitted via the optical transmission path 2500. The reception light amplifier 2370 is provided with a pump LD 2371 that provides light to be amplified.

The reception apparatus 2300 is also provided with a reception OSC 2360 that receives the various supervisory control signals transmitted to the reception apparatus 2300 by the transmission OSC 2240 by using the supervisory control channel. The supervisory control channel allows for bidirectional transmission, and feedback transmission from the reception apparatus 2300 to the transmission apparatus 2100 can be carried out via OSCs on the transmission path.

The reception apparatus 2300 is provided with a wavelength dividing unit 2320 that splits the received light into respective lights of n wavelengths and outputs the lights to a reception transponder 2310. The reception apparatus 2300 is provided with n reception transponders 2310, n being an arbitrary number that corresponds to the number of divided wavelengths. With regard to n reception transponders 2310 provided to the reception apparatus 2300 where n is an arbitrary number, for example, n is represented by n=40 when the received light is split into forty wavelengths, and n is represented by n=80 when the received light is split into eighty wavelengths.

The reception apparatus 2300 is provided with a tilt detection unit 2380 that detects the difference in the optical strength level of an ASE light between the long wavelength side and the short wavelength side to determine the amount of the first-order correction, which is a linear correction. The reception apparatus 2300 is also provided with a control circuit 2350 that supervises and controls the tilt detection unit 2380, the reception light amplifier 2370, and the like.

The control circuit 2350 performs the first-order tilt correction of a communication light by appropriately adjusting the amplification amount of a pump LD 2371 so as to reduce the difference in the optical strength level of an ASE light between the long wavelength side and the short wavelength side, which is detected by the tilt detection unit 2380.

In reference to FIGS. 4 and 5, a detailed description is made in the following regarding a configuration where the optical WDM transmission system 2000 performs a second-order tilt correction. As shown in, for example, FIG. 2, the optical WDM transmission system 2000 computes and determines the amount of the second-order correction for processing the ASE light in a cumulative manner to which the first-order correction, which is a linear correction, has been performed.

Figure 4:
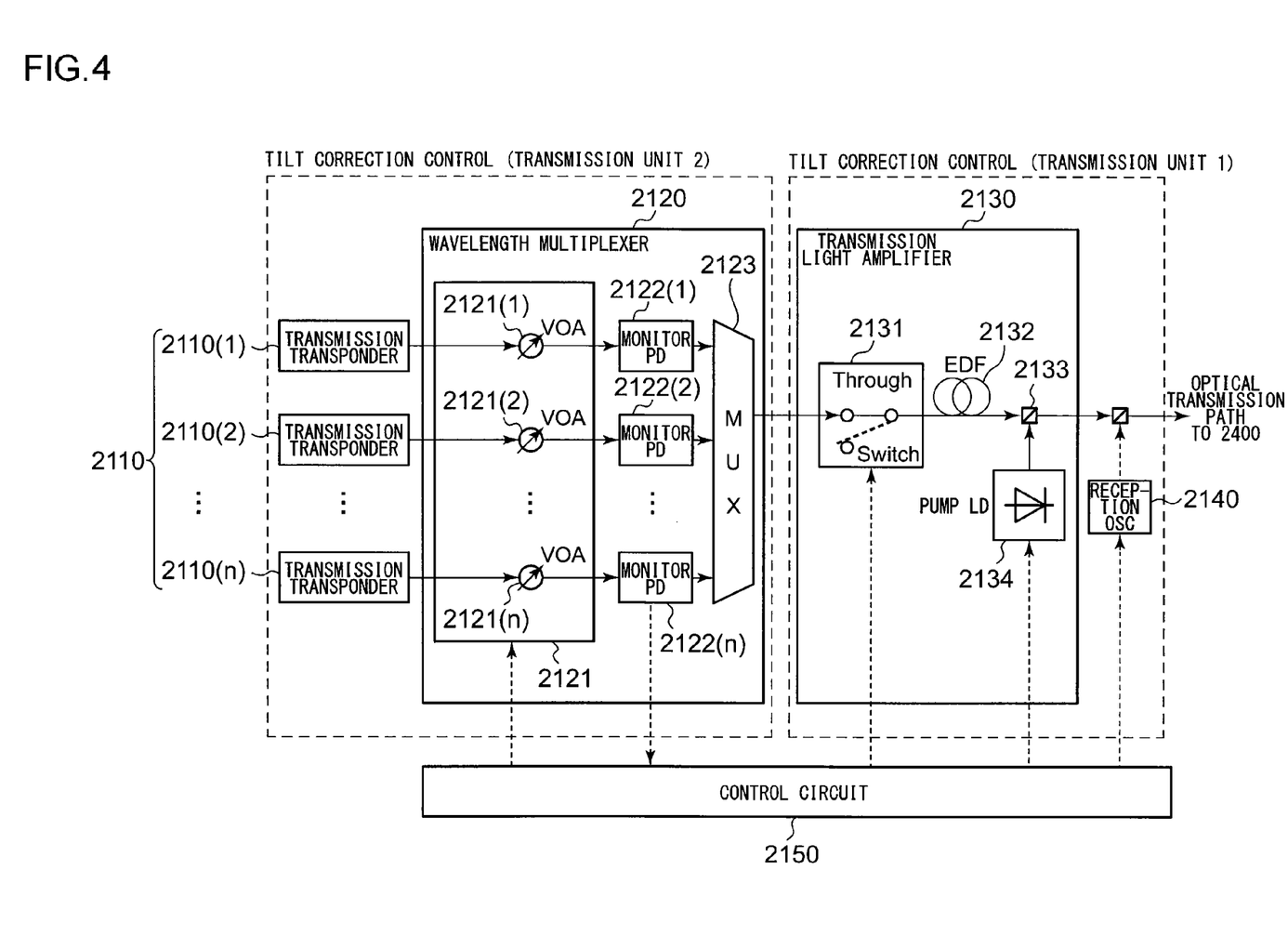
FIG. 4 is a diagram schematically illustrating the configuration of a wavelength multiplexer of a transmission apparatus.

FIG. 4 is a diagram schematically illustrating the configuration of the wavelength multiplexer 2120 of the transmission apparatus 2100. In FIG. 4, components corresponding to those in FIG. 2 are denoted with corresponding reference numerals and descriptions thereof will be omitted in order to avoid any duplication of explanations. As shown in FIG. 4, the wavelength multiplexer 2120 is provided with n VOAs 2121 provided corresponding to all channels, n monitor PDs 2122 provided corresponding to all the channels, and a MUX (multiplexer) 2123 that multiplexes respective lights of n wavelengths that respectively correspond to n channels.

The VOA 2121 performs a second-order tilt correction of a communication light by adjusting VOAs 2121(1), 2121(2), . . . , and 2121(n) for respective channels so as to reduce the difference among the optical strength levels of the ASE light of respective channels that have been transmitted from the reception apparatus 2300 as feedback and the average optical strength level of the ASE light of all channels.

The amount of the second-order tilt correction of the respective VOA 2121 of each channel may be set and stored in a control circuit 2150, a storage unit, or the like when the amount of the second-order correction is determined in advance by using the ASE light. In transmitting a communication light, the control circuit 2150 may perform correction control on the VOA 2121 for each channel based on the amount of the second-order tilt correction, which has been set and stored, of the respective VOA 2121 for each channel.

The transmission light amplifier 2130 is provided with a cut-off unit 2131 that switches between cutting off and transmitting a communication light. The transmission light amplifier 2130 is also provided with an EDF (Erbium Doped Fiber) 2132 that effects optical amplification. The transmission light amplifier 2130 is also provided with an optical multiplexer/demultiplexer 2133 that outputs an excitation light from a pump LD 2134 to an EDF 2132.

Figure 5:
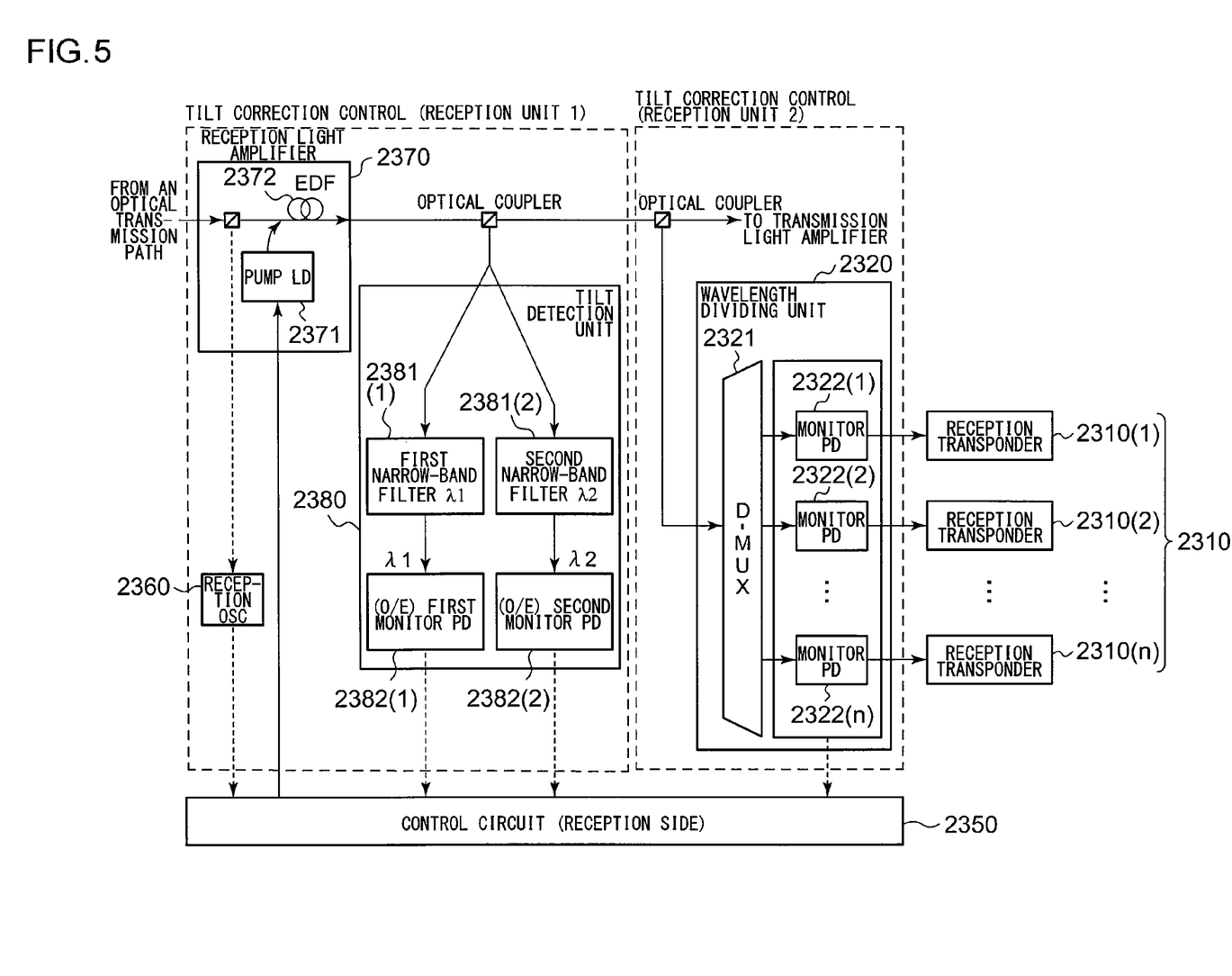
FIG. 5 is a diagram schematically illustrating the configuration of a wavelength dividing unit of a reception apparatus.

FIG. 5 is a diagram schematically illustrating the configuration of a wavelength dividing unit 2320 of the reception apparatus 2300. In FIG. 5, components corresponding to those in FIG. 2 are denoted with corresponding reference numerals and descriptions thereof will be omitted in order to avoid any duplication of explanations. As shown in FIG. 5, the wavelength dividing unit 2320 is provided with a DMUX 2321 that splits a received communication light into n channels corresponding to n wavelengths and n monitor PDs 2322 provided corresponding to the number n of the channels into which the received communication light is split.

The monitor PD 2322 detects the optical strength level of an ASM light of each channel to determine the amount of the second-order tilt correction and outputs the optical strength level to a control circuit 2350. The control circuit 2350 computes for each channel the differences among the average optical strength level of the ASE light of all channels and the optical strength level of the ASE light of each channel and feeds back the difference to the transmission apparatus 2100 via the reception OSC 2360 by transmission performed by the supervisory control channel. The transmission apparatus 2100 determines the amount of the second-order tilt correction of the VOAs 2121 (1), 2121(2), . . . , and 2121(n) for respective channels so as to reduce the difference in optical strength levels regarding the feedback and performs a second-order tilt correction by appropriately adjusting a communication light based on the determined amount of the second-order tilt correction.

The reception light amplifier 2370 is provided with an EDF 2372 that effects optical amplification. The reception light amplifier 2370 outputs an excitation light from a pump LD 2371 to an EDF 2372. The tilt detection unit 2380 is provided with a fixed narrow-band optical filter 2381 that extracts two probe lights from an ASE light received via the reception light amplifier 2370.

Figure 6:
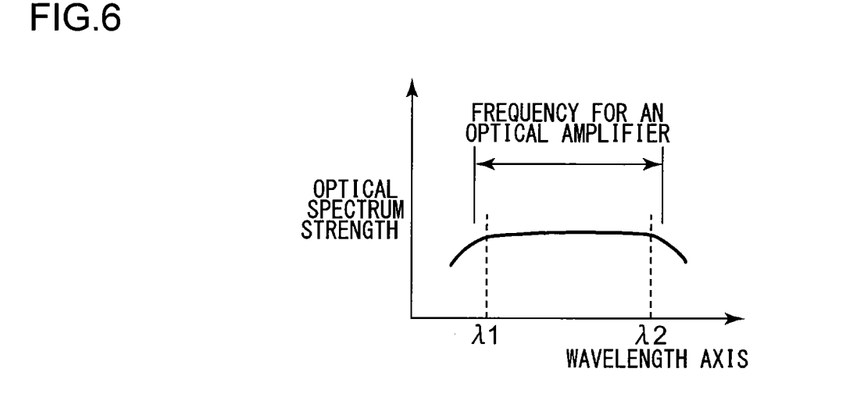
FIG. 6 is a diagram illustrating a probe light on the short wavelength ($\lambda 1$) side and a probe light on the long wavelength ($\lambda 2$) side.

The fixed narrow-band optical filter (band-pass filter) 2381 can be, for example, both a first narrow-band filter 2381(1) that extracts a probe light on the short wavelength (λ1) side and a second narrow-band filter 2381(2) that extracts a probe light on the long wavelength (λ2) side. The probe lights extracted by the first narrow-band filter 2381(1) and by the second narrow-band filter 2381(2) are photoelectric-converted by a first monitor PD (O/E) 2383(1) and a second monitor PD (O/E) 2383(2), respectively, and then input to the control circuit 2350. FIG. 6 is a diagram illustrating a probe light on the short wavelength (λ1) side and a probe light on the long wavelength (λ2) side.

The configurations and the operations of the reception light amplifier 2370 and the tilt detection unit 2380 that are provided to the above-described reception apparatus 2300 are identical with the configurations and the operations of the reception light amplifier 2270 and the tilt detection unit 2280 that are provided to the relay apparatus 2200. Thus, the explanation thereof is omitted for the relay apparatus 2200 in order to avoid any duplication of explanations.

In other words, the reception apparatus 2300 and the relay apparatus 2200 perform the same correction process regarding the first-order tilt correction. To the extent of the function of determining the amount of a first-order tilt correction by using a received ASE light and then performing a first-order tilt correction of a received communication light, the relay apparatus 2200 can be considered as the reception apparatus 2300.

A detailed description is made regarding the overview of a first-order correction process and second-order correction process of the optical WDM transmission system 2000. In FIGS. 2, 4, and 5, the transmission apparatus 2100 passes from the transmission light amplifier 2130 an ASE light having the property of being flat in the optical strength level in a large-bandwidth not including the bandwidth of a signal light (communication light). The ASE light passed from the transmission light amplifier 2130 passes on the optical transmission path 2400 and is input into the reception light amplifier 2270 of the relay apparatus 2200.

With regard to the ASE light input to the reception light amplifier 2270, the short wavelength (λ1) and the long wavelength (λ2) are extracted as probe lights by using a narrow-band filter (not shown) (corresponding to the narrow-band filter 2381) in the tilt detection unit 2280. The optical strength levels of the two extracted probe lights (λ1, λ2) are photoelectric-converted by a monitor PD (not shown) (corresponding to the monitor PD 2382), provided to the tilt detection unit 2280, and then input to the control circuit 2250.

The control circuit 2250 computes as the linear amount of the first-order tilt correction the difference in the optical strength level between the two probe lights, respectively, of the short wavelength (λ1) and the long wavelength (λ2). Based on the computation result of the difference in the optical strength level between the two probe lights, the control circuit 2250 determines the linear amount of tilt correction to adjust and control the pump LD 2271 inside the reception light amplifier 2270 so as to reduce the difference in the optical strength level between the two probe lights.

The reception apparatus 2300 also performs a first-order correction control in a linear manner, which is identical with that of the relay apparatus 2200. In other words, the transmission apparatus 2100 passes from the transmission light amplifier 2130 an ASE light having the property of being flat in the optical strength level in a large-bandwidth not including the bandwidth of a signal light. The ASE light passed from the transmission light amplifier 2130 passes on the optical transmission paths 2400 and 2500 and is input into the reception light amplifier 2370 of the relay apparatus 2300.

With regard to the ASE light input to the reception light amplifier 2370, the two probe lights respectively of the short wavelength (λ1) and the long wavelength (λ2) are extracted from the ASE light by passing through the narrow-band filter 2381 provided to the tilt detection unit 2380. The optical strength levels of the two extracted probe lights (λ1, λ2) are photoelectric-converted by a monitor PD 2382 provided to the tilt detection unit 2380 and then input to the control circuit 2350.

The control circuit 2350 calculates as the linear amount of the first-order tilt correction the difference in the optical strength level between the two probe lights, respectively, of the short wavelength (λ1) and the long wavelength (λ2). In other words, based on the calculation result of the difference in the optical strength level between the two probe lights, the control circuit 2350 determines the linear amount of tilt correction to adjust and control the pump LD 2371 inside the reception light amplifier 2370 so as to reduce the difference in the optical strength level between the two probe lights.

The conceptual diagram of a first-order tilt correction, which is a linear correction, is shown by graph for the explanation of the overview of the first-order tilt correction at the bottom of FIG. 2. In general, it is known that the optical strength of a channel on the long wavelength side increases as if it absorbs the optical strength of a channel on the short wavelength side, as shown in FIG. 7.

Figure 1:
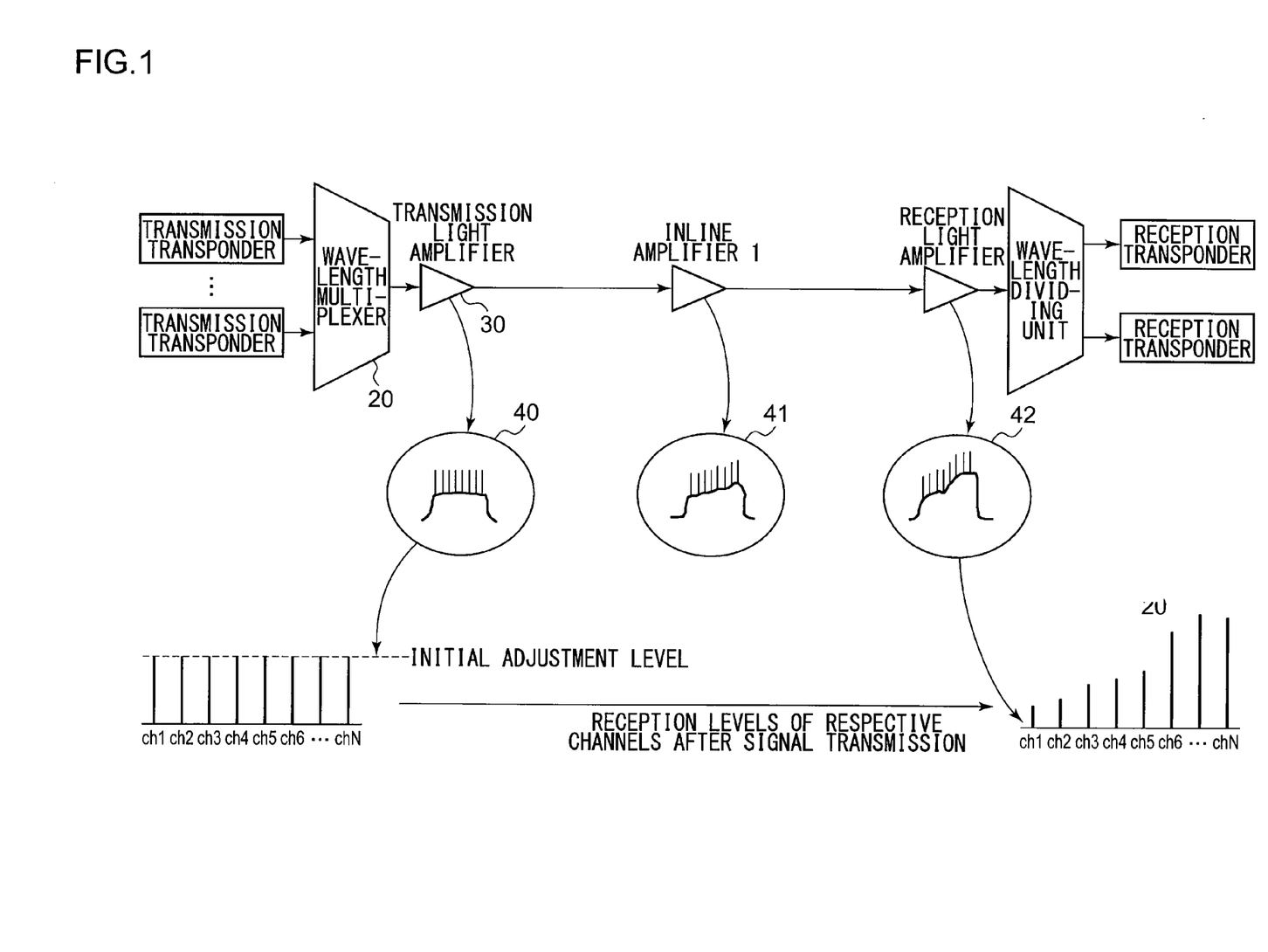
FIG. 1 is a diagram illustrating the situation where the optical strength of a channel on the long wavelength side increases as if it absorbs the optical strength of a channel on the short wavelength side as the relay nodes increase.
Figure 7:
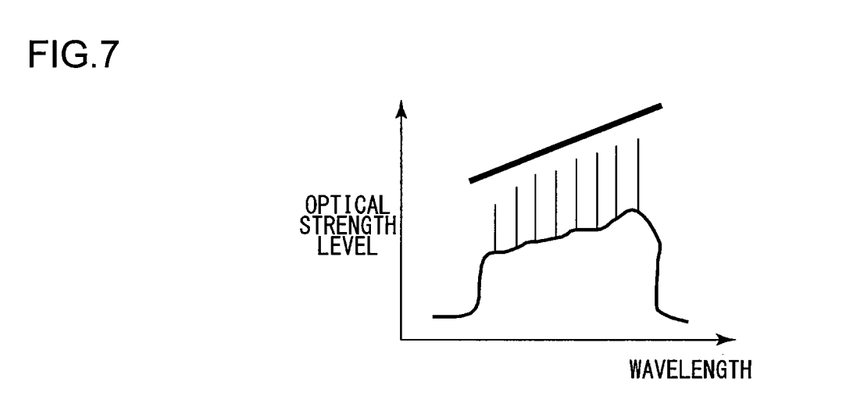
FIG. 7 is a conceptual diagram illustrating tilt having a property such that the differences in the optical strength levels among channels are represented in a linear shape.

FIG. 7 is a conceptual diagram illustrating tilt having the property such that the differences in the optical strength levels among channels are represented in a linear shape. With respect to a communication light having the property as shown in FIG. 7, the above-described first-order correction, which is a linear correction, is relatively effective. FIG. 1 is a diagram illustrating the situation where the optical strength of a channel on the long wavelength side increases as if it absorbs the optical strength of a channel on the short wavelength side as the relay nodes increase.

Figure 8:
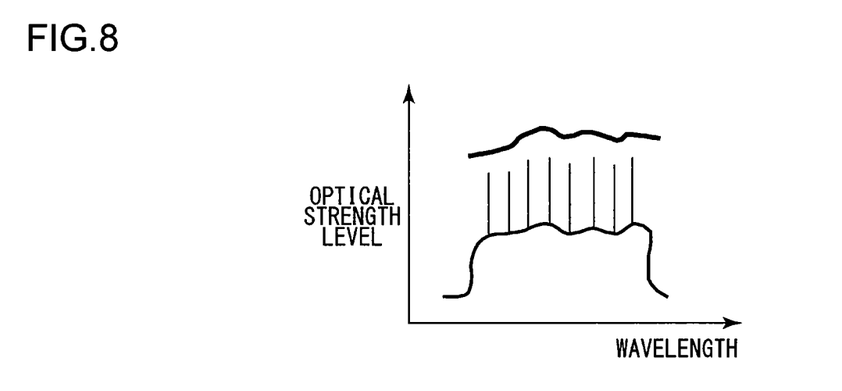
FIG. 8 is a conceptual diagram illustrating the tilt of a spectrum having a property such that the optical strength levels of the channels vary from one another.

In this case, the control circuits 2250 and 2350 allow the pump LDs 2271 and 2371 to perform a correction as a first-order tilt correction by reducing Gain on the long wavelength side to be smaller than that on the short wavelength side in a linear manner. As shown by spectrums 2600 and 2700 in FIG. 2, this allows the optical WDM transmission system 2000 to obtain a spectrum on which the first-order tilt correction is performed. FIG. 8 is a conceptual diagram illustrating the tilt of a spectrum with the properties of optical strength where the optical strength levels of the channels vary from one another. After the first-order tilt correction, the spectrum has the properties of optical strength where a high-level tilt stays behind, as shown in FIG. 8.

In FIG. 1, the wavelength multiplexer 20 of the transmitting node flattens the optical strength levels corresponding to the respective channels and passes the lights of the respective channels. Thus, the optical strength levels of lights corresponding to respective channels that are output from the transmission amplifier 30 become uniform. However, a tilt correction is not properly performed when, for example, the length of a transmission path is different from the length that is initially expected at the time of the design phase or when the type of a fiber is different, and a slope is thus created as shown by the spectrums 41 and 42, producing the difference in the optical strength levels among channels.

A method of using a spectrum analyzer (a measure) at a node on the receiving side allows for tilt correction by accurately monitoring the difference in the optical strength levels among channels. However, the method is directed for WDM products in a long haul area where the number of multiplexed wavelengths is relatively large and where long-distance transmission is necessary since the method requires a complicated configuration and spectrum analyzers are expensive.

Figure 3:
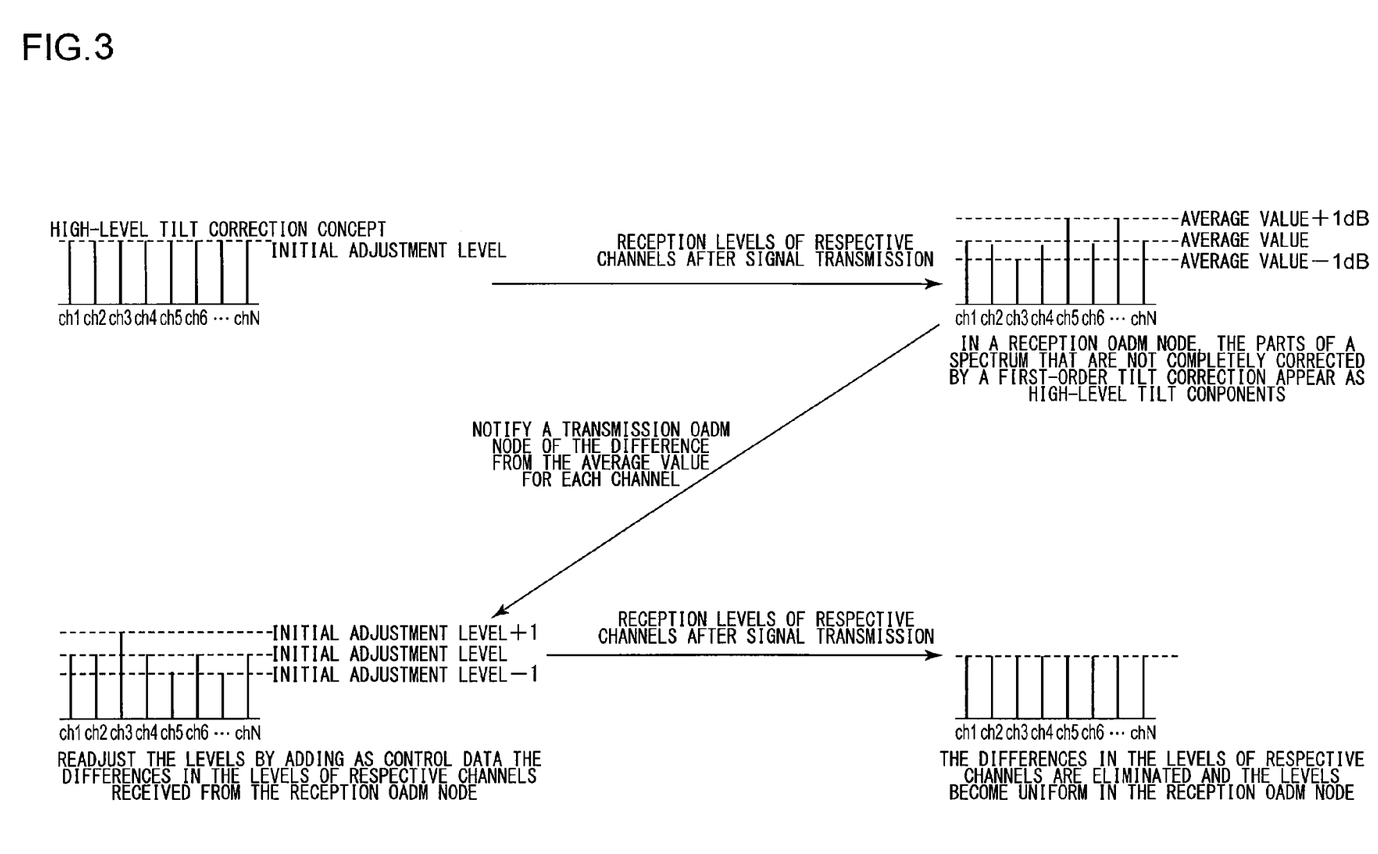
FIG. 3 is a schematic diagram illustrating a high-level second-order tilt correction concept.

In reference to FIGS. 2 and 3, a detailed description is now given of a process of a second-order tilt correction that corrects high-level tilt. As a spectrum shown as the reception levels of channels in the upper right of FIG. 3 after signal transmission, the spectrum after the first-order tilt correction does not exhibit the optical strength levels of the channels that are uniform. FIG. 3 is a schematic diagram illustrating a high-level second-order tilt correction concept.

The wavelength dividing unit 2320 detects an input ASE light strength level at the monitor PD 2322 and transmits the optical strength level of each channel from the monitor PD 2322 to the control circuit 2350. The control circuit 2350 obtains the average value of the optical strength levels of all channels based on the received data of the optical strength level of each channel.

The control circuit 2350 computes for each channel the differences among the average values of all the channels and the values of the optical strength level of the channel. The control unit 2350 transmits the computed difference to the transmission apparatus 2100 by using an OSC line, that is, a supervisory control channel. Based on the received difference value for each channel, the transmission apparatus 2100 adjusts the second-order tilt for the VOA 2121 inside the wavelength multiplexer 2120 so as to raise the transmission optical strength level for a channel with a low optical strength level and to lower the transmission optical strength level for a channel with a high optical strength level.

The value of the correction adjustment may be stored in a memory unit provided inside the control circuit 2350 and then retrieved and applied during the transmission of a communication light. This allows the reception apparatus 2300 to receive a signal having the property of a flat optical strength with tilt components including high-level tilt components that are corrected for respective channels.

Figure 10:
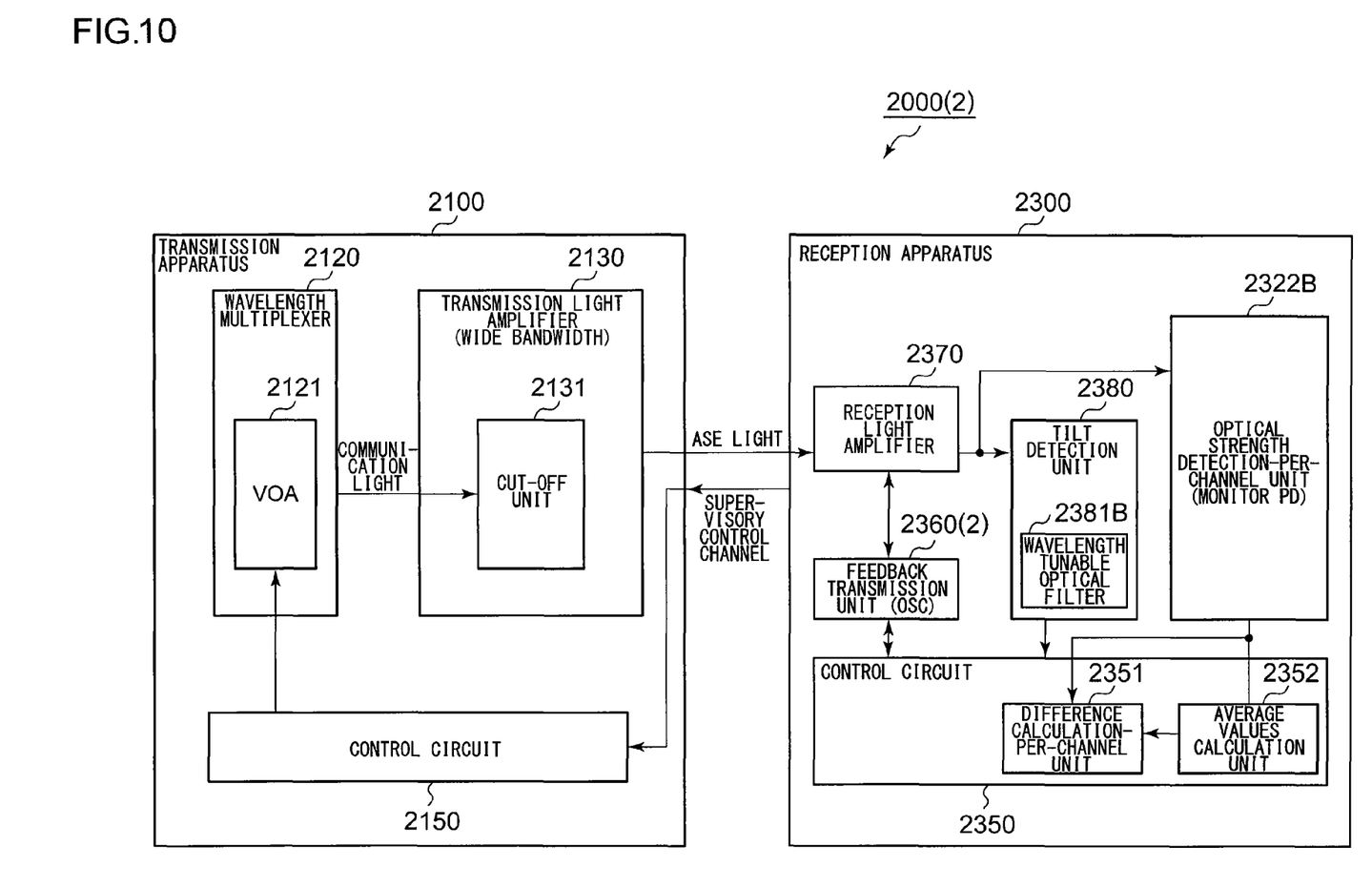
FIG. 10 is a diagram conceptually illustrating the functions of the optical wavelength division multiplex transmission system in a block configuration.

FIG. 10 is a diagram that conceptually explains in a block configuration the functions of an optical wavelength division multiplex transmission system 2000(2). In FIG. 10, components corresponding to those in, for example, FIGS. 2, 4, and 5 are denoted with corresponding reference numerals and descriptions thereof will be omitted in order to avoid any duplication of explanations.

In the optical WDM transmission system 2000(2) shown in FIG. 10, a feedback transmission unit 2360(2) corresponds to the reception OSC 2360 provided to the reception apparatus 2300. In the optical WDM transmission system 2000(2), an optical strength detection-per-channel unit 2322B corresponds to a monitor PD 2322 provided to the reception apparatus 2300.

As shown in FIG. 10, the control circuit 2350 of the reception apparatus 2300 is provided with an average value calculation unit 2352 that calculates the average value of the optical strength levels of an ASE light of all the channels that are detected for respective channels by the optical strength detection-per-channel unit 2322B.

The control circuit 2350 of the reception apparatus 2300 is provided with a difference calculation-per-channel unit 2351 that computes the differences among the average values of the optical strength levels of an ASE light of all the channels that are calculated by the average value calculation unit 2352 and the optical strength level of an ASE light that is detected for each channel by the optical strength detection-per-channel unit 2322B.

The ASE light passed by the transmission light amplifier 2130 has a light energy distributed in a wide range of wavelengths, the wide range of wavelengths corresponding to the amplification bandwidth of the transmission light amplifier 2130. The tilt detection unit 2380 that detects the linear tilt for a first-order tilt correction may be provided with a tunable optical filter 2381B. The tunable optical filter 2381B extracts two probe lights with short and long wavelengths.

Figure 9:
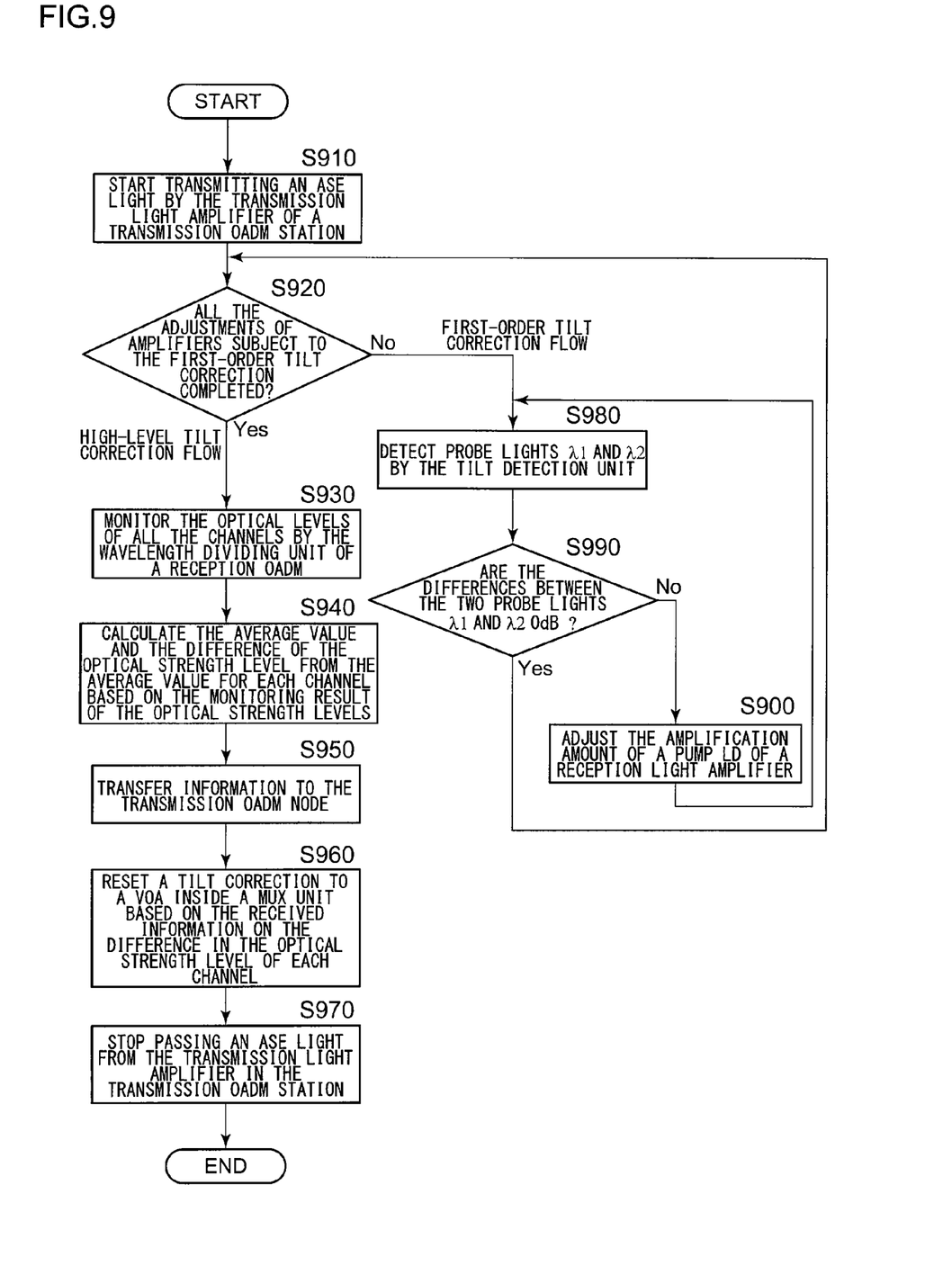
FIG. 9 is a flow diagram illustrating the operation and processes of an optical wavelength division multiplex transmission system.

FIG. 9 is a flow diagram illustrating the operation and processes of the optical WDM transmission system 2000 and the optical WDM transmission system 2000(2).

(Step S910)

The transmission light amplifier 2130 of a transmission OADM station (corresponding to the transmission apparatus 2100) starts passing an ASE light. It is assumed that the cut-off unit 2131 cuts off the communication light during the process of the step S910. The cut-off unit 2131 may be a switch that switches between bringing a communication light into conduction and bringing a communication light into non-conduction.

(Step S920)

The optical WDM transmission system 2000 determines whether or not the all the adjustments and corrections of the reception light amplifiers 2270 and 2370 that are subject to the first-order tilt correction are completed. When all the adjustments and corrections of the reception light amplifiers 2270 and 2370 that are subject to the first-order tilt correction are completed, the step is advanced to Step S930. If any of the adjustments and corrections of the reception light amplifiers 2270 and 2370 that are subject to the first-order tilt correction are not completed, the step is advanced to Step S980.

(Step S930)

The optical WDM transmission system 2000 detects the optical strength levels of all the channels by the wavelength dividing unit 2320 of the reception OADM station (corresponding to the reception apparatus 2300).

(Step S940)

Based on the monitoring result of the optical strength levels, the control circuit 2350 computes the average value and the difference of the optical strength level from the average value for each channel.

(Step S950)

Information on the difference computed in the step S940 is transferred to the transmission OADM node.

(Step S960)

Based on the received information on the optical strength level of each channel, the transmission apparatus 2100 resets a second-order tilt correction to the VOA 2121 inside the wavelength multiplexer 2120.

(Step S970)

In the transmission OADM station, the optical WDM transmission system 2000 stops passing an ASE light from the transmission light amplifier 2130.

(Step S980)

The tilt detection unit 2380 of the reception apparatus 2300 extracts two probe lights λ1 and λ2 from the ASE light.

(Step S990)

The control circuit 2350 determines whether or not the difference in the optical strength level between the two probe lights λ1 and λ2 is 0 dB. When the difference in the optical strength level between the two probe lights λ1 and λ2 is 0 dB, the step goes back to Step S920. When the difference in the optical strength level between the two probe lights λ1 and λ2 is not 0 dB, the step is advanced to Step S900.

(Step S900)

The control circuit 2350 performs a first-order correction by adjusting the amplification amount of the pump LD 2371 of the reception light amplifier 2370 so that the difference in the optical strength level determined in the step S990 becomes 0 dB.

In the above description of the optical WDM transmission system 2000, when the monitor values (dBm) of the probe lights λ1 and λ2 are defined to be PRmon1 and PRmon2, respectively, the first tilt detection amount (dBm) is determined by the following equation.

First tilt detection amount (dBm)=(*PRmon*1)−(*PRmon*2)

At the same time, a light switch may be provided to the transmission light amplifier 2130 on the transmission apparatus 2100 side as the cut-off unit 2131. When performing a tilt correction control by using an ASE light, the control circuit 2150 drops a signal from the wavelength multiplexer 2120 by, for example, turning the light switch to open position. As a result, a transmission signal becomes a signal for transmitting a light spectrum having a wide bandwidth, which corresponds to the amplification bandwidth of the transmission light amplifier 2130.

Based on the above configuration and operation, adjusting the pump LDs 2271 and 2371 that are respectively in the reception light amplifiers 2270 and 2370 by the control circuits 2250 and 2350, respectively, so that the difference becomes the smallest for the optical strength level between the probe lights λ1 and λ2, which are respectively detected by the tilt detection unit 2280 in the relay apparatus 2200 and the tilt detection unit 2380 in the reception apparatus 2300, allows for the correction of a first tilt component.

In the second-order correction, the strength level of an ASE light generated by a tilt correction control (transmission unit 1) is measured by the monitor PD unit 2322. The result of the measurement is transmitted to the control circuit 2350, and both the average optical power of all channels and the difference for each channel in the optical strength level from the average optical power of all channels are computed.

(Step 1: Compute the Average Optical Strength Level of All Channels)

The average optical strength level of all channels is defined as follows:

The average optical strength level of all channels (*CHtyp*)(dBm)=[(*CH*1 monitor value)+(*CH*2 monitor value)+(*CH*3 monitor value)+ . . . + (*CHn* monitor value)]/*n*

(Step 2: Compute, for Each Channel, its Difference of the Optical Strength Level from the Average Optical Strength Level)

The difference of CH1 from the average level (CHdif1) (dB)=(CH1 monitor value)−(CHtyp), The difference of CH2 from the average level (CHdif2)(dB)=(CH2 monitor value)−(CHtyp), The difference of CH3 from the average level (CHdif3)(dB)=(CH3 monitor value)−(CHtyp), . . . , The difference of CHn from the average level (CHdifn)(dB)=(CHn monitor value)−(CHtyp)

The above computation result is transmitted to a transmission OADM node by using an OSC line, and a VOA is readjusted for a second-order correction by, for example, an adjustment obtained by subtracting the amount of tilt correction from a default VOA adjustment value, which is set in advance to the VOA 2121.

When the Default VOA Adjustment Value is defined to be (VOAdef)(dB), the respective VOA readjustment levels (VOAreaj)(dB) of channels are defined as follows:

Each VOA readjustment level (VOAreaj)(dB) is defined a follows: The readjustment level of CH1 (VOAreaj1)(dB)= (VOAdef)−(CHdif1), The readjustment level of CH2 (VOAreaj2)(dB)=(VOAdef)−(CHdif2), The readjustment level of CH3 (VOAreaj3)(dB)=(VOAdef)−(CHdif3), . . . , The readjustment level of CHn (VOAreajn)(dB)=(VOAdef)− (CHdifn)

Performing the above control calculation process allows the optical WDM transmission system 2000 to correct high-level tilt.

The above-stated optical WDM transmission system 2000 is a system for automatically correcting a tilt and uses an ASE light from a transmission light amplifier without any wavelength set particularly for the correction of tilt. As a result, an optical communication system added with a function of automatic tilt control can be economically achieved without increasing the size of the apparatus that constitutes the optical communication system.

The application of the invention allows the performance of the optical WDM transmission system 2000 to be improved as a WDM system, allowing, for example, a relay, through where a regeneration relay is conventionally required by once converting an electric signal at a relay station along the way, only with an optical amplifier. Thus, a huge reduction of cost can be expected for the whole system.

Also, the tilt for all channels can be measured by using an ASE light, allowing for highly accurate tilt correction. Using an ASE light allows for tilt correction during the system construction; thus, tilt correction does not need to be carried out again by, for example, amplifying the value indicating the amount of lights. Therefore, this is a very effective method in the case where high-speed wavelength extension, such as route switching in mesh topology, is required.

The WDM transmission system 2000 and the like are not restricted only to the above-described configuration, operation process, and computation process. It is understood that various modifications to the configuration, operation process, and computation process thereof are possible and that such modifications are also within the scope of the present invention.

INDUSTRIAL APPLICABILITY

The present invention can be used for an optical WDM transmission system or the like where communication lights of multiple wavelength channels are multiplexed and sequentially transmitted.

What is claimed is:

1. A transmission system comprising: a transmission apparatus operative to output an ASE light from a transmission light amplifier; and a reception apparatus including: a tilt detection unit operative to detect the optical strength levels of at least two probe lights having different wavelengths from the received ASE light; an EDF operative to effect optical amplification; a pump LD operative to supply an excitation light to the EDF; a control unit operative to perform a first order tilt correction on light to be output form the EDF in a linear manner by adjusting an amplification amount of the pump LD so as to reduce the difference in the optical strength level of the two probe lights detected by the tilt detection unit, the transmission apparatus outputs an ASE light that corresponds to each of a plurality of channels for different wavelengths, the reception apparatus includes:

a demultiplexer that splits the received ASE light into the plurality of channels;

a plurality of monitor photo diodes that detects the optical strength level of the plurality of channels produced by splitting by the demultiplexer;

an average value calculation unit that computes the average value of the optical strength levels detected by the plurality of monitor photo diodes;

a difference calculation-per-channel unit that calculates for each channel the difference between the average value computed by the average value calculation unit and the optical strength level detected by each one of the plurality of monitor photo diodes; and a feedback transmission unit that transmits as feedback the difference calculated by the difference calculation-per-channel unit to the transmission apparatus, and wherein the transmission apparatus performs a second-order tilt correction by adjusting for each channel a Variable Optical Attenuator (VOA) of a wavelength multiplexer so as to reduce the difference transmitted as feedback by the feedback transmission unit.

2. The transmission system according to claim 1, wherein the transmission light amplifier includes a cut-off unit that cuts off a communication light so that the reception light amplifier performs the first-order tilt correction based on the ASE light output from the transmission light amplifier when the transmission amplifier does not output the communication light.

3. The transmission system according to claim 1, wherein the tilt detection unit includes two fixed narrow-band optical filters that extract the two probe lights from the received ASE light.

4. The transmission system according to claim 1, wherein the tilt detection unit includes one tunable optical filter that extracts the two probe lights from the received ASE light.

5. The transmission system according to claim 1, wherein the feedback transmission unit uses a supervisory control channel when transmitting as feedback the difference calculated by the difference calculation-per-channel unit to the transmission apparatus.

6. A tilt correction method of a transmission system comprising:

outputting an ASE light from a reception light amplifier by a transmission apparatus;

performing tilt detection by detecting the optical strength levels of at least two probe lights having different wavelengths from the received ASE light by an reception apparatus;

performing a first-order tilt correction by the reception apparatus on light output from an EDF in a linear manner by adjusting an amplification amount of a pump LD so as to reduce the difference in the optical strength levels;

outputting, by the transmission apparatus, an ASE light that corresponds to each of a plurality of channels for different wavelengths, splitting, by a demultiplexer of the reception apparatus, the received ASE light into the plurality of channels;

performing, by a plurality of monitor photo diodes, an optical strength level detection on a per-channel basis by detecting the optical strength level of the plurality of channels produced by splitting;

performing, by the reception apparatus, an average value calculation so as to calculate the average value of the optical strength levels detected in the optical strength level detection on a per-channel basis;

performing, by the reception apparatus, a difference calculation per channel so as to calculate for each channel the difference between the average value calculated in the average value calculation and the optical strength level detected in the optical strength level detection on a per-channel basis;

performing, by the reception apparatus, a feedback transmission so as to transmit as feedback the difference calculated in the difference calculation per channel to the transmission apparatus; and performing, by the transmission apparatus, a second-order tilt correction by adjusting for each channel a Variable Optical Attenuator (VOA) of a wavelength multiplexer so as to reduce the difference transmitted as feedback in the feedback transmission.

7. The tilt correction method of a transmission system according to claim 6 comprising:

cutting off, by the transmission light amplifier, a communication light so that the reception light amplifier performs the first-order tilt correction based on the ASE light output from the transmission light amplifier when the transmission amplifier does not output the communication light.

8. The tilt correction method of a transmission system according to claim 6, wherein in performing the tilt detection, the two probe lights are extracted from the ASE light received by using two fixed narrow-band optical filters.

9. The tilt correction method of a transmission system according to claim 6, wherein in performing the tilt detection, the two probe lights are extracted from the ASE light received by using one tunable optical filter.

10. The tilt correction method of a transmission system according to claim 6, wherein in the feedback transmission, the difference calculated in the difference calculation per channel is transmitted as feedback to the transmission apparatus by using a supervisory control channel.

* * * * *